US006633475B2

(12) United States Patent
Thiele

(10) Patent No.: US 6,633,475 B2
(45) Date of Patent: Oct. 14, 2003

(54) HIGH SIDE SUPPLY SHUT DOWN CIRCUIT

(75) Inventor: Karsten E. Thiele, West Bloomfield, MI (US)

(73) Assignee: Robert Bosch Corporation, Broadview, IL (US)

( * ) Notice: Subject to any disclaimer, the term of this patent is extended or adjusted under 35 U.S.C. 154(b) by 244 days.

(21) Appl. No.: 09/888,111

(22) Filed: Jun. 22, 2001

(65) Prior Publication Data

US 2003/0043521 A1 Mar. 6, 2003

(51) Int. Cl.[7] .................................................. H02H 5/00
(52) U.S. Cl. ........................................................ 361/104
(58) Field of Search ................................ 361/104, 108, 361/93

(56) References Cited

U.S. PATENT DOCUMENTS

| | | | | |
|---|---|---|---|---|
| 3,619,635 A | * | 11/1971 | Thompson et al. | 307/11 |
| 5,019,937 A | * | 5/1991 | Beard | 361/102 |
| 5,381,296 A | * | 1/1995 | Ekelund et al. | 361/106 |
| 5,528,444 A | * | 6/1996 | Cooke et al. | 361/20 |
| 5,907,467 A | * | 5/1999 | Barbour | 361/170 |
| 6,256,183 B1 | * | 7/2001 | Mosesian | 361/104 |
| 6,366,208 B1 | * | 4/2002 | Hopkins et al. | 340/650 |

* cited by examiner

*Primary Examiner*—Adolf D. Berhane
(74) *Attorney, Agent, or Firm*—Jacques M. Dulin, Esq.; Innovation Law Group, Ltd.

(57) ABSTRACT

A low cost high side supply shut down circuit that operates to deactivate the power supply of a central supply, such as to pressure regulators, solenoid valves, etc., as parts of non-repairable electro-hydraulic transmission modules in the event of a malfunction, e.g. a low side driver circuit failure. The supply voltage is connected to the high side of a fuse. The load circuits receive power or no power depending on the operating condition of the fuse. Coupled across the fuse is a fuse trigger status detection circuit as part of a diagnostics and control module. The diagnostics and control module is connected to the input of a shut down low side output driver circuit. The attached low side loads have individual detection circuits that are coupled to the diagnostics and control module as well as their enable inputs. Based on information gathered from feedback lines, the fuse will be triggered (opened) by the low side driver circuit that is capable of driving a current that exceeds the maximum operational current of the fuse. When the fuse opens, the current to the load circuits is interrupted, thereby protecting the loads driven by the load circuits from permanent damage.

25 Claims, 3 Drawing Sheets

HIGH SIDE SUPPLY SHUT DOWN CIRCUIT

TECHNICAL FIELD

This invention relates to low cost high side supply shut down circuits, and, more particularly, to circuits that can deactivate a centralized high side supply. The invention may be used with high side supplied electrical loads, e.g. pressure regulators, solenoid valves, etc. Industrial Applicability includes use in vehicle electro-hydraulic transmission modules to respond in the event of a system-required supply shut down.

BACKGROUND

In some electronic or electromechanical systems, there are instances in which it is desired to protect an overall system from the adverse impact of an output load driver failure. An output load driver failure or malfunction means, in particular, the inability to control the output load driver. The only way to regain limited control over the system is to deactivate the central load supply, which permits bringing the overall system into a defined and safe mode. The malfunction of an output load driver could have devastating consequences on the overall system with the effect of damaging the downstream load, e.g. hydraulic sub-components, or other equipment. Such driver malfunctions may significantly damage other ancillary equipment (e.g. clutches), or may be dangerous to a human operator of the equipment.

This invention relates to high side supply shut down circuits, and, more particularly, to circuits that can deactivate a centralized high side supply, used with high side supplied electrical loads. Particularly useful examples include, e.g., pressure regulators, solenoid valves, etc., as part of a vehicle electro-hydraulic transmission module in the event of a system requested supply shut down. Such electro-hydraulic transmission modules have and will have everyday use in automobiles, trucks, buses, motorcycles, watercraft, airplanes, spacecrafts, and other engine driven vehicles.

FIG. 1 is a schematic diagram illustrating a prior art example of a solution to activate and deactivate a central supply voltage. Supply voltage 102 is connected between ground and the high side of switch 108. The low side of switch 108 is connected to loads 118, 122, 126. The first load 118 is connected in series to the low side of switch 108. Transistor 116 is connected to the load 118 and to subsequent circuitry or, as indicated, to ground potential. The second load 122 is connected in series with switch 108, as well, and the enabling transistor 120 couples load 122 to ground potential. Similarly, load 126 is connected in series on the low side of switch 108 and is enabled by transistor 124 to ground potential. The high sides of the load circuits 118, 122, and 126 are connected with each other and will be receiving power or no power depending on the operation of switch 108. The enabling inputs 140, 142, 144 to transistors 116, 120, 124 would include any typical input, depending upon the environment in which the circuit is utilized and the required tasks to be undertaken.

Connected to the high side (supply voltage) of the relay switch 108 (also called relay terminals) is relay coil 80 that activates the relay switch 108. The low side of relay coil 80 is connected to transistor 114. In enabled operation, current would flow through relay coil 80 and through transistor 114. The current through the relay coil 80 operates to close switch 108 (or here, the relay terminals 108). With terminals 108 closed, power is supplied to the load circuits 118, 122, and 126. In a predetermined sequence, if a deactivation signal is applied to the input 148 of transistor 114, transistor 114 will be inactivated, thereby interrupting the current flow through relay coil 80. When this current flow is interrupted, terminals 108 open and interrupt the power on loads 118, 122, and 126. The deactivation or activation signal that can be applied to input 148 of transistor 114 is based on a pre-determined strategy or paradigm generated from the diagnostics and control module 160 (e.g. micro-controller or other electronics). If, for example, transistor 116 fails, which could be determined by the diagnostics feedback signal 150 and is not able to deactivate load 118, the diagnostics and control module 160 will send a deactivation signal to the input 148 of transistor 114. Transistor 114 will then interrupt the current flow through relay coil 80. This will interrupt (open) the relay terminals 108 and consequently the power supply for all loads including load 118, which was uncontrollable by transistor 116. The same case example can be exercised regarding transistor 124 with the related feedback signal 152, and transistor 120 with feedback signal 154. In addition to the output driver feedback lines, the system has a feedback 156 for the actual supply voltage to the loads and a feedback 162 measuring the actual voltage 102 on the high side of the relay terminals. The feedback line 158 allows a plausibility check between the status of the relay terminals 108 and the drive status of the relay coil 80. In case of an activated relay coil 80, the low side feedback signal 158 of the relay coil 80 has to be plausible with the high side feedback signal 162 of relay terminals 108 and the low side feedback signal 156 of relay terminals 108 and vice versa.

FIG. 2 is a second prior art supply malfunction load protection strategy similar to that of the prior art solution in FIG. 1. In FIG. 2, a high side semiconductor switch control circuit 86 (also called a field effect transistor, or FET) is substituted for the relay coil 80 and the relay terminals 108 in FIG. 1. Instead of terminals 108, as in FIG. 1, the drain source path of FET 86 is utilized in series with the supply voltage. Instead of relay coil 80, as in FIG. 1, the gate of FET 86 is utilized as control input. In case of a shut down scenario, high side switch control circuit 86 would receive a disabling signal on control line 148. With this disabling signal 148, the power flow to loads 118, 122, 126 would be interrupted. Due to the non-existence of a separate drive circuit (coil 80, as in FIG. 1) and switch circuit (terminals 108, as in FIG. 1), the feedback line 158 of FIG. 1 is not required.

While the circuitry of FIGS. 1 and 2 have been shown in the prior art, these circuits have significant drawbacks. Specifically, in automotive or other vehicle control systems such prior art solutions are based on more expensive semiconductor high side switches or relays that are not feasible for hybrid or surface mounted technology applicable to automotive controllers. High side switches require a charge pump circuit, which makes them cost ineffective and requires space on a hybrid or printed circuit board. Historically, the need for a redundant activation/deactivation path (relay solution, FIG. 1 or high side driver circuit solution, FIG. 2) in automotive controllers was driven by the need to deactivate a faulty low side driver. The goal of such deactivation was to avoid damage to the attached external circuitry, i.e., attempting to limit repair to replacement of the automotive controller. However, that approach is no longer feasible because of upcoming integration of automotive controllers with the formerly external circuitry into non-repairable units. As a result of the circuit integration, the deactivation functionality can be reduced to a one-time malfunction event handling with the entire integrated circuit/ controller unit being replaced. Damage to the downstream equipment (e.g. hydraulic sub-components) is no longer critical under these conditions. The goal of this deactivation strategy, in the case of an output driver malfunction, is to avoid devastating situations to other ancillary equipment (e.g. clutches), or danger to a human operator of this equipment.

Accordingly, there is a need in the art for an improved power supply shut down circuit that is suitable for surface mounting, and is cost effective, particularly for integrated controller/circuit units of electro-hydraulic vehicle systems.

THE INVENTION

SUMMARY, INCLUDING OBJECTS AND ADVANTAGES

The present invention relates to a high side supply shutdown circuit that is surface mountable and is a cost effective solution for integrated controller/circuit units. A principal embodiment includes a fuse that is coupled between the central high side power supply and downstream load circuits. A monitoring circuit for diagnostics purposes is added on the low side of the fuse. Furthermore, the downstream load circuits (e.g. load with low side output driver) have a diagnostic and control link to a diagnostics and control module. This diagnostics and control circuit monitors the downstream load circuit feedback to determine if operations are within parameter specification (plausibility) and controls the operation of the low side output drivers. The diagnostics and control module also controls the shutdown circuit, which deactivates the central power supply by triggering the fuse. In the case of non-plausibility (out of spec condition) of the downstream load circuit feedback, the inventive circuit allows the current through the fuse to exceed the operating level of the fuse when the shutdown transistor receives an enabling signal from the diagnostics and control module. The circuit also includes one or more load circuits coupled to the low side of the fuse, with the load circuits receiving operating current through the fuse.

Further embodiments are also disclosed, including a fuse diagnostic system and method for shutting down the power through the load circuits when a low side output driver or fuse, is in a non-plausible (out of spec) state.

BRIEF DESCRIPTION OF THE DRAWINGS

For a more complete understanding of the embodiments of the invention herein, reference may be had to the following detailed description in conjunction with the drawings wherein.

Reference numbers refer to the same or equivalent parts of the present invention throughout the various figures of the drawings.

DETAILED DESCRIPTION, INCLUDING THE BEST MODE OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives, and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents, and applications cited in this specification are herein incorporated by reference as if each individual publication, patent, or application had been expressly stated to be incorporated by reference.

This invention relates to a high side supply shut down circuit which operates to deactivate a central high side supply for electrical loads, such as supply to pressure regulators, solenoid valves, etc., which are generally used in electro-hydraulic transmission modules in the event of a low side load driver failure. Such electro-hydraulic transmission modules have everyday use in automobiles, trucks, buses, and other engine driven vehicles.

Figure 1:
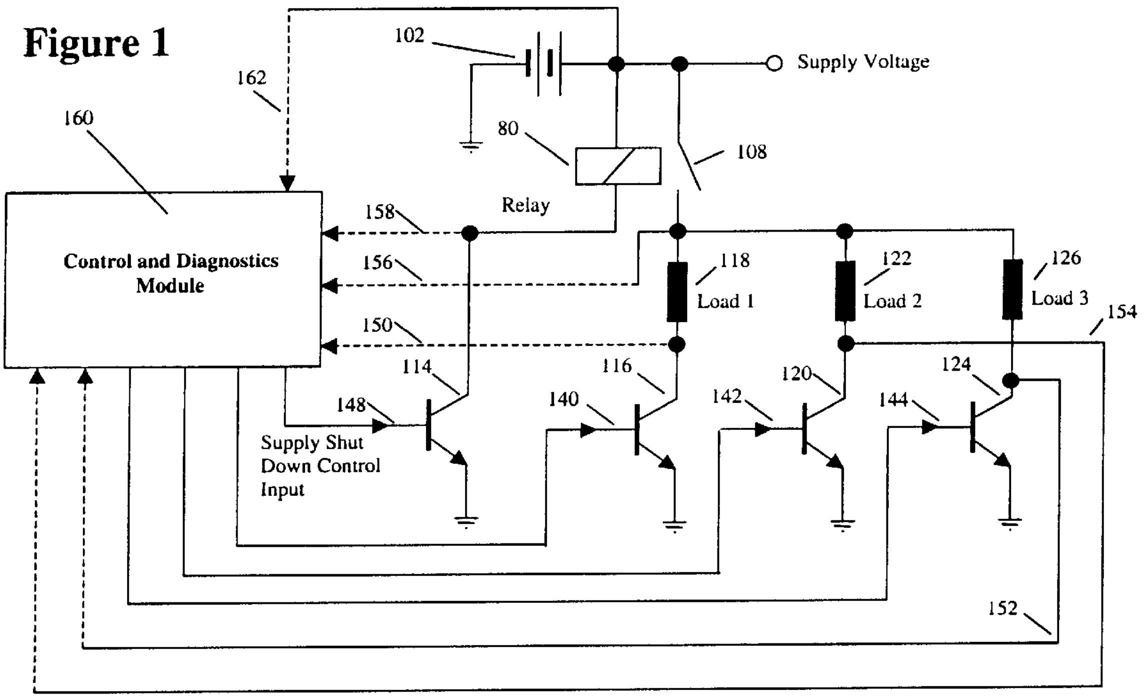
FIGS. 1 and 2 are schematic diagrams of typical prior art solutions to supply side shutdown circuits.
Figure 2:
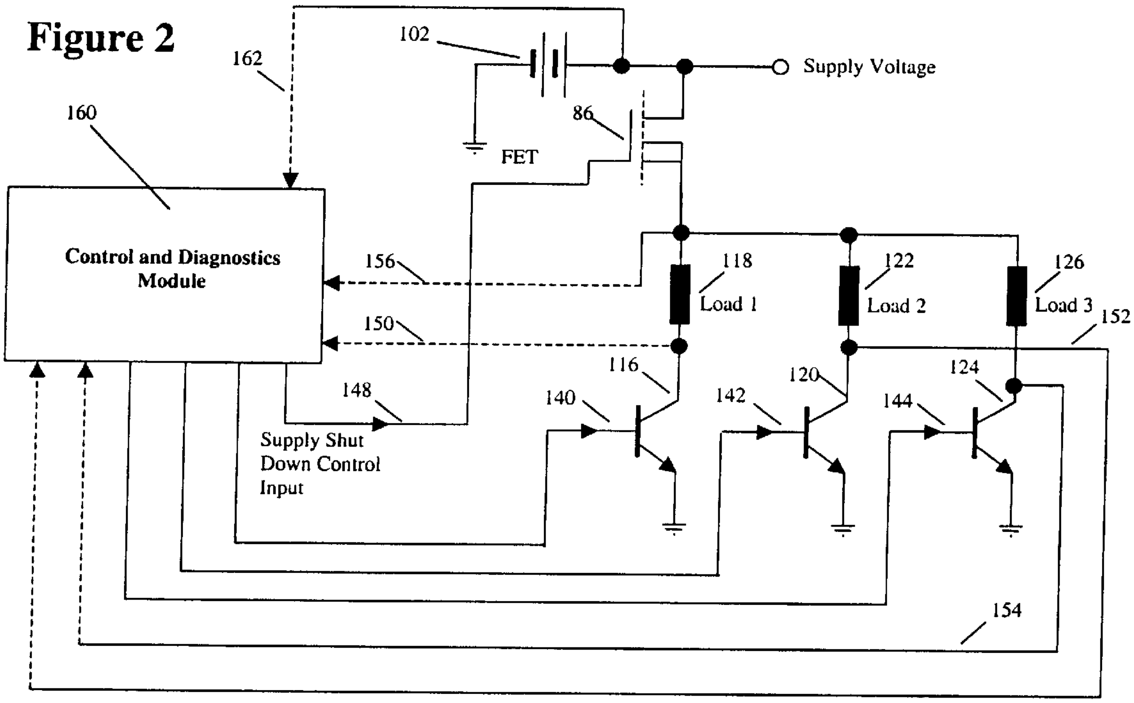
Figure 3:
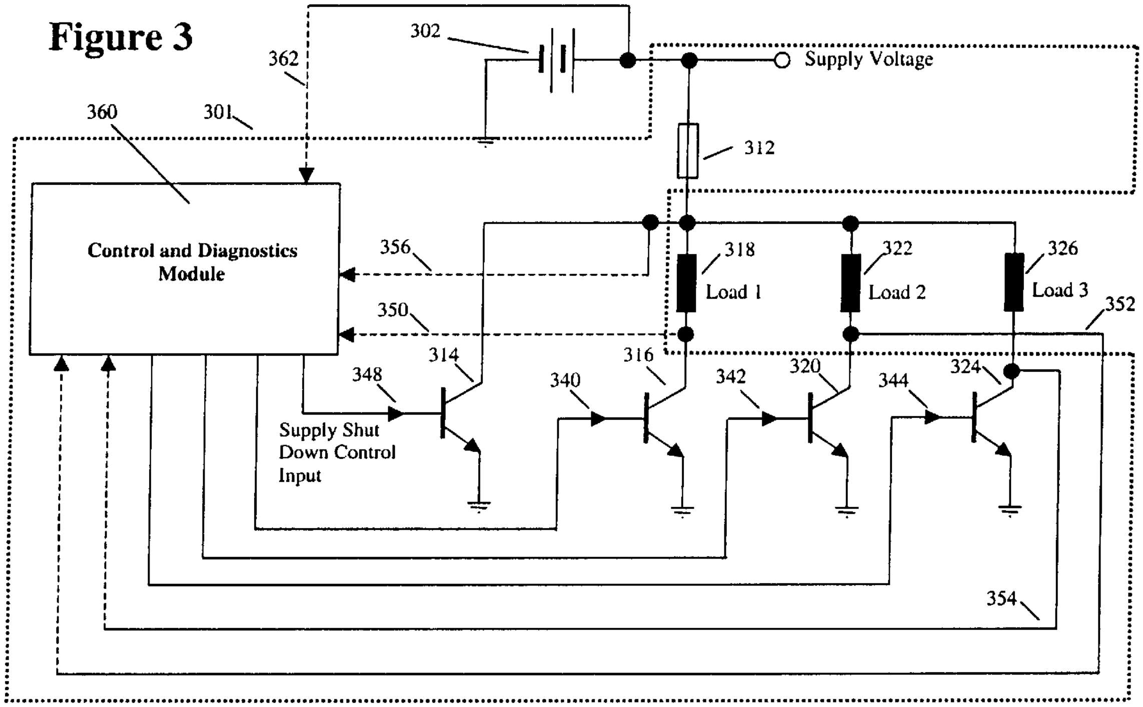
FIG. 3 is an exemplary schematic diagram of a currently preferred embodiment of a high side supply shut down circuit in accordance with the present invention.

FIG. 3 is a schematic diagram illustrating the principles of the preferred embodiment of the present invention. The supply voltage 302 is connected between ground and the fuse 312, which protects the rest of the circuitry following the fuse. The first load 318 is connected in series to the low side of fuse 312. A low side output driver, symbolized by the NPN transistor 316, is connected to the load 318 and to subsequent circuitry or, as indicated, to ground potential. The second load 322 is connected in series with the fuse 312, as well, and the enabling low side output driver as symbolized by NPN transistor 320 couples load 322 to ground potential. Similarly, third load 326 is connected in series between the low side of fuse 312 and is enabled by a low side output driver symbolized by the transistor 324 to ground potential. The load circuits 318, 322, and 326 are connected in parallel and receive either power or no power depending on the condition of fuse 312. The enabling inputs 340, 342, 344 to low side output drivers 316, 320, 324 are generated by control and diagnostics module 360, and typically depend upon the vehicle transmission being utilized and the required tasks to be undertaken, e.g., gear changes by switching between hydraulic channels with on/off valves, and opening/closing of clutches with pressure regulators. While three loads, 318, 322, and 326, are depicted, the number of loads may vary, as the circuits shown are exemplary only for purposes of description.

Connected to the low side of the fuse is the feedback line 356. This feedback line is connected to the diagnostics and control module 360. Further, the diagnostics and control module is connected to the input of the shut down low side output driver symbolized as NPN transistor 314. When activated, the shut down transistor 314 is enabled and acts as a short circuit for supply voltage 302 to ground potential that will overload fuse 312, thereby opening the fuse 312. Dotted line 301 encloses the portion of the circuit that typically can be surface mountable on a carrier entity such as a single circuit board or hybrid.

In operation, the supply voltage 302 will be permanently connected via fuse 312 to the load circuits 318, 322, and 326.

While power is being permanently applied to loads 318, 322, 326, a current flow through each load, and consequently the activation of each load, is selectively controlled when an enabling signal is applied to inputs 340, 342, 344 of transistors 316, 320, 324, respectively. An enabling signal to input 342 allows current to flow through load 322 via transistor 320 to ground potential. Similarly, an enabling input 344 to transistor 324 would allow current to flow through load 326 and an enabling input 340 to transistor 316 would allow current to flow through load 318. Transistors 316, 320, 324 will be enabled based on a predetermined strategy from the diagnostics and control module 360. In the case of an automatic vehicle transmission, these loads can be solenoid valves, pressure regulators, etc., which control hydraulic circuits and consequently gear shift operations. These loads are in electro-hydraulic modules typically not removable from the output driver and control electronics. Thus, the permanent damage of these loads due to low side output driver malfunction (e.g. 316, 320, 324) is no longer of concern. In case of such an output driver malfunction, the inventive load deactivation strategy is just to shut down the central power supply permanently by enabling the shut down transistor 314, which acts as a short circuit for supply voltage 302 to ground potential. This overloads fuse 312, thereby opening the fuse 312 and deactivating the downstream loads.

Feedback line 356 permits monitoring the fuse low side voltage level compared to the fuse high side voltage level from feedback 362. Together, these signals make it possible to diagnose the status of the fuse and comprise, with the controller 360, the fuse diagnostic system. If the shut down transistor 314 is not enabled, the low side voltage level (on feedback line 356) of the fuse 312 compared the high side voltage level of the fuse 312 from feedback 362 must be almost equal. If the low side feedback line 356 of the fuse detects a lower voltage, either the fuse is interrupted or another failure condition is present. If the shut down transistor 314 is enabled, the low side voltage level (on feedback line 356) of the fuse 312 compared the high side voltage level of the fuse 312 from feedback 362 will be much lower, e.g., in the best case, 0V. If the low side feedback line 356 of the fuse detects an almost equal voltage, either the low side of the fuse is shorted to the high side of the fuse or another failure condition is present. That is, the monitoring circuit coupled across the fuse 312 detects the status of the fuse, and the controller 360 enables the shutdown transistor 314, via control input 348 and disables the low side output drivers 316, 320 and 324, in the event of the occurrence of at least one predetermined parameter being out of spec.

The control and diagnostics module 360 also monitors the status of the voltage across loads 318, 322, and 326 via feedback lines 356 and low side feedback lines 350, 352, 354. Input lines 340, 342, and 344 from the control and diagnostics module 360 enable the operation of low side output driver transistors 316, 320, and 324. In the event of an out of specification operation of either the loads 318, 322, and 326, or the transistors 316, 320, and 324, the current is indirectly detected and monitored by the control and diagnostics module 360. Module 360 monitors current through load 318 via feedback lines 350 and 356, through load 322 via feedback lines 352 and 356, and through load 326, via feedback lines 354 and 356. Thus, in addition to monitoring the voltage across fuse 312, the current through loads 318, 322, and 326 can be similarly, and alternatively, monitored indirectly via the feedback lines 350, 352, 354, and 356 to the control and diagnostics module 360. If the current flow through loads 318, 322, 326 or the operation of transistors 316, 320, 324 exceeds specification, the control and diagnostics module 360 generates an output signal on line 348 to enable shutdown transistor 314. Similar to the procedure outlined above for monitoring the status of fuse 312, the enabling of shutdown transistor 314 allows the current through fuse 312 to increase (due to a reduction of resistance in the shutdown circuit), which triggers the operation of fuse 312 when its operating current is exceeded. When the fuse "blows," or opens, the current flow to the load circuits is interrupted quickly and permanently. Also, the control and diagnostics module 360 could disable the particular load circuit by withdrawing an enable signal to one or more transistors 316, 320, or 324. Disabling any one load circuit allows the other load circuits to continue operating.

As a diagnostics feature, the inventive circuit permits driving output shut down transistor 314 for a very short duration. This short drive pulse will not substantially change the actual status of the load, but will be detectable on the feedback line 356. This feature makes it possible to diagnose the actual capability of the system to deactivate the central power supply in an emergency situation. If the diagnostics pulse is detectable on feedback line 356, the shut off circuit is still working. The length of the diagnostics drive pulse has to be timed not to exceed the trigger current of the fuse. Further, one skilled in the art will appreciate that combined diagnostics applications of this test pulse method are easily enabled.

Industrial Applicability

It is evident that the improved inventive shut down circuit of the invention has wide applicability to a broad range of powered circuits. A particularly suitable field is application to vehicle circuits; for example, electronic circuits integrated into an electro-hydraulic module.

In addition, the shut down circuit has applicability in avionics, particularly aircraft and space vehicles, where the loads are typically critical and switch failure could result in serious adverse effects on such loads.

One skilled in the art will readily appreciate that the circuit of the invention can be realized in commercial practice in a straightforward manner, and that the advantages are highly cost effective.

While embodiments and applications of this invention have been shown and described, it will be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A fuse trigger circuit comprising:

a) a central power supply;

b) a fuse coupled to one side of said central power supply;

c) a shut down transistor circuit coupled to the low side of said fuse capable of driving a current, said current selectively exceeding the maximum operational current of said fuse to open said fuse; and d) a monitoring circuit coupled across the fuse to detect the status of said fuse and enabling said shut down transistor in the event of the occurrence of at least one predetermined parameter.

2. The fuse trigger circuit of claim 1 further including one or more low side load circuits coupled to the low side of said fuse.

3. The fuse trigger circuit of claim 2 further including low side output drive circuits between said low side load circuits and ground potential under control of said monitoring circuit.

4. The fuse trigger circuit of claim 3 wherein said monitoring circuit includes a diagnostics and control module for controlling the system decisions based on a predetermined paradigm of operational parameters.

5. The fuse trigger circuit of claim 4 further including a first feedback line from the high side of said fuse to said diagnostics and control module, and a second feedback line from the low side of said fuse to said diagnostics and control module, said first and second feedback lines allowing said diagnostics and control module to monitor the operative status of said fuse.

6. The fuse trigger circuit of claim 5 that includes an additional feedback line to said diagnostics and control module from the low side of each of said load circuits, said diagnostics and control module providing a signal on output lines to said load circuits to control the current flow individually in each load circuit.

7. The fuse trigger circuit of claim 6 further including an output line from said diagnostics and control module to said shut down transistor circuit, said diagnostics and control module providing an enabling signal to said shut down transistor circuit upon receipt of an indicating signal detected by at least one of said first and second feedback lines and the feedback line of each said load circuit, wherein the enabling of said shut down transistor circuit allows current to flow in said shut down transistor circuit and said fuse, said current being higher than the operative current of said fuse.

8. The fuse trigger circuit of claim 4 further including one or more load circuits coupled to the low side of said fuse, said load circuits receiving operating current through said fuse.

9. The fuse trigger circuit of claim 8 wherein said current through said load circuits ceases upon opening of said fuse.

10. The fuse trigger circuit of claim 7 wherein said enabling signal is generated in response to a predetermined paradigm of operational parameters in said diagnostics and control module driven by system conditions.

11. The fuse trigger circuit of claim 7 wherein said control module is configured to provide at least one short duration pulse to said shutdown transistor which does not trigger the fuse and to monitor said first feedback line for presence of a pulse to determine the operability of said fuse trigger circuit.

12. A fuse trigger circuit comprising:

a) a central power supply, b) a fuse coupled to one side of said central power supply, c) a shut down circuit capable of driving a current, said current selectively exceeding the maximum operational current of said fuse, d) at least one low side load circuits coupled to the low side of said fuse, and e) a monitoring circuit for monitoring the status of said load circuits and enabling said shut down circuit in the event of the occurrence of at least one predetermined parameter.

13. The fuse trigger circuit of claim 12 wherein said low side load circuits receive operating current through said fuse.

14. The fuse trigger circuit of claim 13 wherein an enabling signal is generated in response to a predetermined paradigm of operational parameters in said monitoring circuit driven by external or internal system conditions in said load circuits.

15. The fuse trigger circuit of claim 14 further including an output line from said monitoring circuit to said shut down circuit, said monitoring circuit providing said enabling signal to said shut down circuit in response to said predetermined paradigm, wherein the enabling of said shut down circuit allows current to flow in said shut down circuit and said fuse, said current being higher than the operative current of said fuse.

16. The fuse trigger circuit of claim 15 wherein said current through said load circuits ceases upon opening of said fuse.

17. The fuse trigger circuit of claim 16 wherein said enabling signal to said shut down circuit in response to said predetermined paradigm is of very short duration to allow said monitoring circuit to diagnose the capability of the system without triggering the actuation of said shut down circuit to cause the excessive current to flow in said fuse and said shut down circuit.

18. The fuse trigger circuit of claim 15 wherein said monitoring circuit includes a control and diagnostics module for controlling the system decisions based on said predetermined paradigm.

19. The fuse trigger circuit of claim 18 which includes feedback lines from said one or more load circuits to said control and diagnostics module to monitor the individual currents in said loads, said diagnostics and control module providing a signal on output lines to control the current flow individually in each of said load circuits.

20. The fuse trigger circuit of claim 19 wherein said fuse, said shut down circuit, at least one load circuit, and said control and diagnostics module are included on a single carrier entity.

21. The fuse trigger circuit of claim 18 which includes a low side output driver circuit in each of said low side load circuits, and feedback lines from said low side output driver circuits to said control and diagnostics module to monitor the individual low side output driver circuits, said diagnostics module providing a signal on output lines to control the current flow individually in each low side output driver circuit.

22. A method of protecting an electro-hydraulic system, comprising a circuit including at least one load powered by a supply, in the event of output driver malfunction comprising the steps of:

a) providing a fuse intermediate of said load and said supply: and b) enabling at least one current, said current being in excess of said fuse capacity, to open said fuse in the event of at least one parameter exceeding a predetermined specification, thereby interrupting current to said load.

23. The method as in claim 22 further comprising the step of monitoring current through said fuse to detect out of parameter conditions.

24. The method as in claim 22 wherein said enabling current is provided through a shut down transistor in series with the low side of said fuse which is connected to the high side of the said load.

25. The method as in claim 22, which includes the added steps of:

a. enabling a second current pulse of very short duration; and b. monitoring the low side of said fuse to detect a signal corresponding to said pulse to diagnose operating capability of the system without triggering said fuse to open.

* * * * *